(12) United States Patent
Lakhani et al.

(10) Patent No.: US 7,174,508 B2
(45) Date of Patent: Feb. 6, 2007

(54) ADAPTIVE CATALOG PAGE DISPLAY

(75) Inventors: Aalim Lakhani, Toronto (CA); Victor Chan, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 09/998,023

(22) Filed: Nov. 30, 2001

(65) Prior Publication Data

US 2002/0095441 A1    Jul. 18, 2002

(30) Foreign Application Priority Data

Nov. 30, 2000    (CA) .................................. 2327161

(51) Int. Cl.
*G06F 17/00*    (2006.01)

(52) U.S. Cl. ...................... 715/523; 715/513; 715/517

(58) Field of Classification Search ................ 715/513, 715/517, 523; 707/7; 705/27
See application file for complete search history.

(56) References Cited

U.S. PATENT DOCUMENTS

| | | | |
|---|---|---|---|
| 5,890,175 A | | 3/1999 | Wong ........................ 707/505 |
| 5,983,227 A | * | 11/1999 | Nazem et al. ................. 707/10 |
| 5,987,480 A | | 11/1999 | Donohue ..................... 707/501 |
| 6,012,098 A | * | 1/2000 | Bayeh et al. ................ 709/246 |
| 2002/0116293 A1 | * | 8/2002 | Lao et al. ..................... 705/27 |
| 2004/0044590 A1 | * | 3/2004 | Voorhees ..................... 705/27 |

FOREIGN PATENT DOCUMENTS

| | | |
|---|---|---|
| EP | 0889421 | 1/1999 |
| JP | 06 326856 | 11/1994 |
| JP | 09 305472 | 11/1997 |
| JP | 10 124430 | 5/1998 |
| JP | 10 304006 | 11/1998 |
| JP | 11 232186 | 8/1999 |
| JP | 11 275462 | 10/1999 |
| JP | 2000 066868 | 3/2000 |
| JP | 2000 331013 | 11/2000 |
| WO | 9814896 | 4/1998 |
| WO | 9946709 | 9/1999 |
| WO | WO 00/65512 | 11/2000 |

OTHER PUBLICATIONS

"Java Server Pages," found at http://java.sun.com/products/jsp/ archived Nov. 9, 2000.*

* cited by examiner

*Primary Examiner*—Stephen Hong
*Assistant Examiner*—Adam Queler
(74) *Attorney, Agent, or Firm*—A. Bruce Clay, Esq.; Steven M. Greenberg, Esq.; Carey, Rodriguez, Greenberg & Paul, LLP

(57) ABSTRACT

Pages are provided in response to a request from a browser received by a server. The server obtains an adapted page, based on a template page, from a display infrastructure. The display infrastructure uses a template page identifier obtained from a resolution component. The resolution component obtains template page identifiers by matching attributes relating to the page request with attributes associated with template page identifiers stored in a database. The template page identifiers are provided based on the best match of the template page attributes and the page request attributes, with default values being used and a defined ranking being used where multiple matched template pages exist.

10 Claims, 2 Drawing Sheets

ADAPTIVE CATALOG PAGE DISPLAY

FIELD OF THE INVENTION

The present invention is directed to an improvement in computing systems and in particular to an improvement in the adaptive display of pages on computer systems.

BACKGROUND OF THE INVENTION

In web-based computer systems, information is displayed on HTML pages that are requested by browsers and supplied to browsers by web servers. In sophisticated web-based systems the pages to be supplied to browsers may be customized. When a browser makes a request for a page, the web server may respond with one of several possible pages, based on different criteria that are to be evaluated by the web server.

Electronic commerce (e-commerce) merchants typically present pages to customers and potential customers in the form of an on-line catalogue. It is known to provide different pages to consumers based on consumer preferences and characteristics. Such selection between different potentially displayed pages is often accomplished using custom-designed heuristics that vary for different on-line merchants.

To provide tailored pages to consumers, it is known to store differing template pages and to select an appropriate template for completion and presentation to the consumer. A form of template resolution exists in the Net. Commerce™ product of IBM. This prior art approach provides a template lookup based on shopper groups. For the system to function effectively, all shoppers were necessarily included in at least one shopper group. This approach lacks flexibility and is limited in retrieving template pages based on one criteria only, that of a predefined shopper grouping.

It is therefore desirable to have a system for the adaptive display of e-commerce web pages which retrieves template pages based on criteria typically pertaining to e-commerce transactions.

SUMMARY OF THE INVENTION

According to an aspect of the present invention there is provided an improved computer system for sending messages.

In the present invention, pages are provided in response to a request from a browser received by a server. The server obtains an adapted page, based on a template page, from a display infrastructure. The display infrastructure uses a template page identifier obtained from a resolution component. The resolution component obtains template page identifiers by matching attributes relating to the page request with attributes associated with template page identifiers stored in a database. The template page identifiers are provided based on the best match of the template page attributes and the page request attributes, with default values being used and a defined ranking being used where multiple matched template pages exist.

According to another aspect of the invention there is provided a computer system for the adaptive display of pages in response to a page request received by a server, the system including, a display infrastructure component for receiving the page request from the server, a resolution component for identifying a template page for use in generating an adapted page to be returned to the server in response to a received page identification request, a set of template page identifiers and associated template page attributes, accessible by the resolution component, and a set of template pages, accessible by the display infrastructure component, the display infrastructure including means for passing a page identification request to the resolution component in response to the page request from the server, means for receiving a template page identifier from the resolution component, and means for obtaining the template page from the set of template pages corresponding to the received template page identifier and generating an adapted page for return to the server based on the obtained template page, and the resolution component including means for accessing the set of template page identifiers to retrieve one or more members of the set matching template page attribute values determined by the page request and matching default values where template page attribute values are not determinable for the page request.

According to another aspect of the present invention there is provided the above computer system in which the set of template page identifiers and associated template page attributes are stored as a relational database table and are accessible by the resolution component by relational queries.

According to another aspect of the present invention there is provided the above computer system in which the set of template pages includes Java server page files and in which the display infrastructure component includes means for executing Java server page files.

According to another aspect of the present invention there is provided the above computer system further including a template editor for generating members of the set of template pages.

According to another aspect of the present invention there is provided the above computer system in which the template editor generates Java server page files.

According to another aspect of the present invention there is provided the above computer system in which each page request is generated by a consumer for a catalog page for an online store.

According to another aspect of the present invention there is provided the above computer system in which the template page attributes include a group identifier for the consumer, a catalog entry identifier for the catalog page, a store identifier for the online store, an auction flag for the identified catalog entry, and a catalog entry type identifier for the catalog page.

According to another aspect of the present invention there is provided the above computer system in which the page request is associated with a device type determined by the device used by the consumer in requesting a page, and in which the template page attributes further include a device type identifier for identifying device type of the consumer, and a rank number for ranking template pages where multiple template pages match the template page attribute values.

According to another aspect of the present invention there is provided an adaptive page display system for responding to consumer requests, the system including a page database of template page files having unique file names, a name database of template page file names and associated template page attributes, a resolution component for determining request-specific template page attribute values and for retrieving template page file names from the name database, by matching the request-specific template page attribute values with the template page attribute values stored in the name database, and a display infrastructure component for accessing the page database to obtain template page files corresponding to retrieved template page file names from the name database.

According to another aspect of the present invention there is provided the above system for an e-commerce environment including online stores and in which the template pages relate to a catalog, in which the template page attributes include a group identifier, a catalog entry identifier, a store identifier, an auction flag, and a catalog entry type identifier.

According to another aspect of the present invention there is provided the above system in which the template page attributes further include a rank identifier.

According to another aspect of the present invention there is provided the above system in which consumer requests are associated with device types determined by the devices used by consumers in requesting pages, and in which the template page attributes further include a device type identifier.

According to another aspect of the present invention there is provided a computer program product for adaptive page display, the computer program product including a computer usable medium having computer readable code means embodied in said medium, including computer readable program code means for implementing the above-described systems.

According to another aspect of the present invention there is provided a method for the adaptive display of pages in a server environment in response to a page request received by a server, the server environment including, a display infrastructure component for receiving the page request from the server, a resolution component for identifying a template page for use in generating an adapted page to be returned to the server in response to a received page identification request, a set of template page identifiers and associated template page attributes accessible by the resolution component, and a set of template pages, accessible by the display infrastructure component, the method including the following steps:

the display infrastructure passing a page identification request to the resolution component in response to the page request from the server, the display infrastructure receiving a template page identifier from the resolution component, the display infrastructure obtaining the template page from the set of template pages corresponding to the received template page identifier and generating an adapted page for return to the server based on the obtained template page, and the resolution component accessing the set of template page identifiers to retrieve one or more members of the set having matching determinable template page attribute values associated with the page request and matching default values where template page attribute values are not determinable for the page request.

According to another aspect of the present invention there is provided the above method in which the set of template page identifiers and associated template page attributes are stored as a relational database table and which the step fo the resolution component accessing the set of template page identifiers includes the step of generating a relational query to obtain data from the relational database table.

According to another aspect of the present invention there is provided the above method in which the template page attributes include a group identifier for the consumer, a catalog entry identifier for the catalog page, a store identifier for the online store, an auction flag for the identified catalog entry, and a catalog entry type identifier for the catalog page.

According to another aspect of the present invention there is provided the above method in which the page request is associated with a device type determined by the device used by the consumer in requesting a page, and in which the template page attributes further include a device type identifier for identifying device type of the consumer, and a rank number for ranking template pages where multiple template pages match the template page attribute values.

According to another aspect of the present invention there is provided a computer program product for adaptive display of pages, the computer program product including a computer usable medium having computer readable code means embodied in said medium, including computer readable program code means for carrying out the above-described methods.

It will be realized by those skilled in the art that the computer code can comprise a signal carried by a carrier that can be transmitted by wireless or wired systems or on a network such as the Internet.

Advantages of the present invention include a system for adaptive page presentation in which flexible template retrieval is provided.

DETAILED DESCRIPTION OF THE PREFERRED EMBODIMENT

Figure 1:
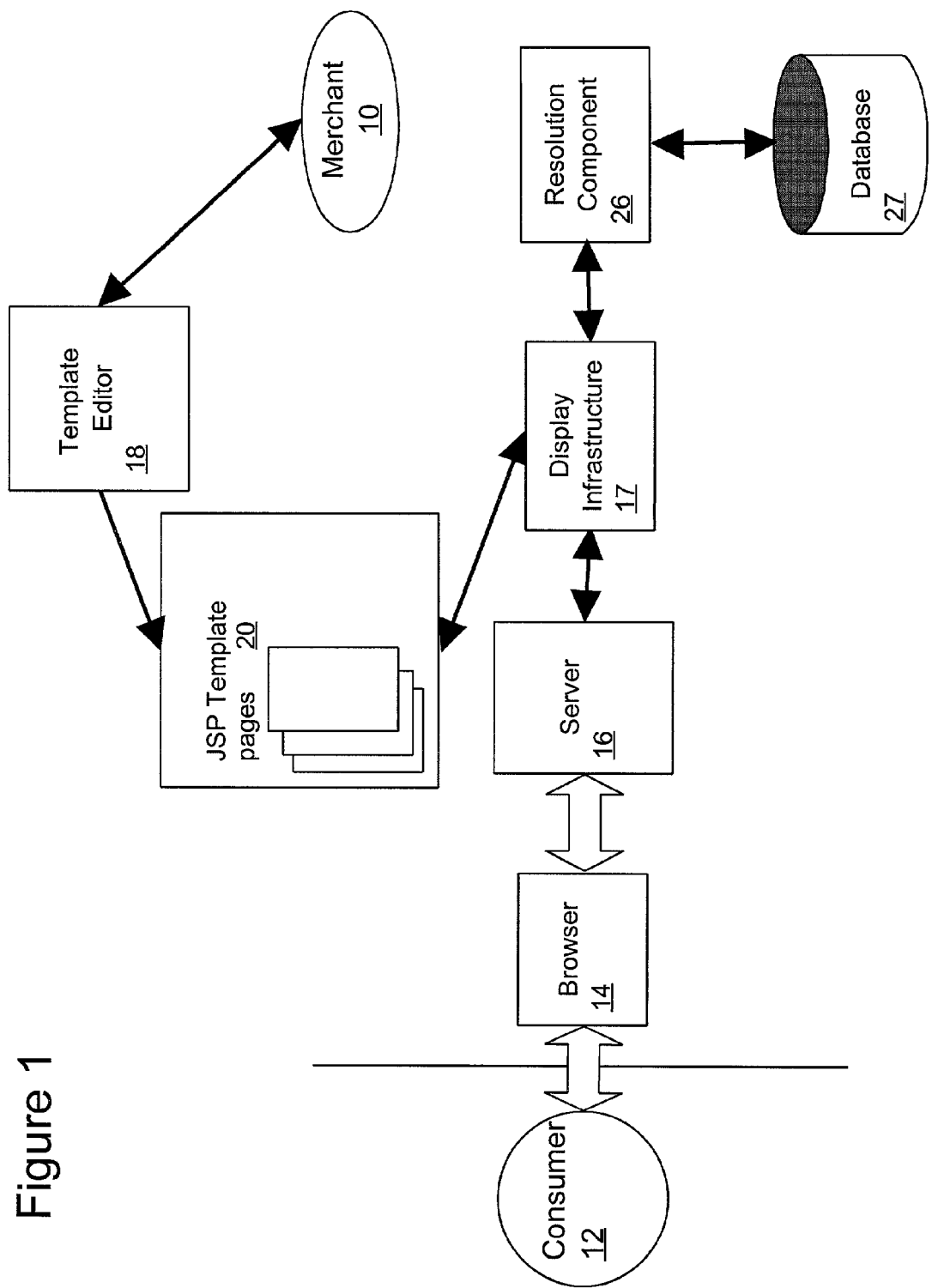
FIG. 1 is a block diagram showing components of a web based e-commerce system including adaptive display pages according to the preferred embodiment.

FIG. 1 shows, in a block diagram format, an example web-based e-commerce system that includes adaptive display pages in accordance with the preferred embodiment. In FIG. 1, merchant 10 and consumer 12 are shown. Consumer 12 uses browser 14 to access server 16. Often such consumer use of an e-commerce system will be by use of a web browser accessing a web server. Other browser-server systems are also able to use the preferred embodiment, however.

As shown in FIG. 1, merchant 10 is able to use a template editor 18 to define templates shown as JSP template pages 20 in the figure. JSP template pages 20 are accessed by display infrastructure 17. Display infrastructure may differ for different implementations but in the preferred embodiment the display infrastructure provides the functionality to access and execute JSP template pages 20.

In the preferred embodiment, resolution component 26 is the component which responds to a request from browser 14 sent to server 16. Resolution component 26 accesses database 27 in determining which template page matches the request.

The system of the preferred embodiment defines certain criteria or attributes that are used to select available template pages (represented in FIG. 1 as template pages 20). These criteria are defined to permit merchant 10 to define a set of template pages for the on-line catalog that will meet the different potential characteristics of consumer 12 and of the store that merchant 10 is presenting in the web site hosted by server 16.

In the preferred embodiment, the criteria (or attributes) available for pages in a catalog presenting catalog entries on the web site of merchant 10 are the following:

1. Member Group ID: Merchant 10 may have defined groups for consumers (for example: "gold" customers and "regular" customers). Often merchants such as merchant 10 wish to display different custom catalog pages for users based on the defined groups into which they fall. For this reason the Member Group ID attribute is defined to permit template pages to be keyed on these groups. In the preferred embodiment Member Group ID supports administrative groups, pricing groups and regional groups.

2. Catalog Entry ID: Display pages may need to be customized based on individual catalog entries. For example, a product with reference number 10 might require a different display template than the product with reference number 15. This occurs, for example, when product 10 is a "featured product" in the catalog. This implies the need for template pages based on individual catalog entries (or product identifier). In the preferred embodiment, a Catalog Entry ID may be associated with bundles, packages and other entries that may occur in the catalog, not only with individual products.

3. Store ID: Where merchant 10 may have more than one on-line store, each store should be able to have its own version of catalog pages. Template pages can therefore by keyed on store ids to permit this differentiation.

4. Auction: This is a flag that identifies whether a template corresponding to a catalog entry that is on Auction. Since auctions are becoming very popular in the e-commerce space, merchants may want to use different display pages for catalog entries that go on auction. For example these pages may have a "BID" rather than a "BUY" button. This implies the need for custom display pages based on the auction state of the catalog entry. In the preferred embodiment, the auction flag may be define different types of auctions that are possible for the catalog entry.

5. Device Type: Consumer 12 may access server 16 using different types of browser 14 supported by different devices. For example, the device supporting browser 14 maybe a PDA, an HTML browser, or some other defined type of web browser device. The page to be displayed will preferably defined to be optimized for the device on which it is to be displayed by browser 14 for consumer 12. Devices such as cell phones demand different templates than traditional web browsers such as Netscape's Navigator due to small screen size and badwidth limitations. This implies the need for custom display pages based on device type.

6. Catalog Entry Type: Merchant 10 may define template pages for different types of information shown in the catalog (ie. whether the catalog entry may, for example, have defined types of information such as package, bundle, product, and item). It is typically the case that an on-line catalog will not be restricted to showing only single products on each page. Different products may be placed in packages (not able to be modified) or bundles (may be added to or deleted from) that are shown together on pages. In the preferred embodiment an item is a single atomic unit that cannot be further specified by selecting characteristics such as colour or size. A product entry, in contrast may be further specified by consumer 12 selecting such characteristics. By including the catalog entry type attribute in the system of the preferred embodiment, template pages are definable by merchant 10 based on the type of catalog entry that is shown on the page being requested by browser 14.

7. Rank Number: This is a sequence specifier defined by merchant 10 to select between different pages where the pages otherwise match in terms of other attributes set out above.

In the preferred embodiment, merchant 10 is able to define template pages based on any one (or a combination) of the above criteria. The preferred embodiment includes resolution component 26, used to ensure that display infrastructure 17 retrieves the correct page (from template pages 20 in the example of FIG. 1) in response to a request from browser 14. For example, using this approach a merchant 10 defines one of template pages 20 for gold customers (Member Group ID=Gold) shopping the clothing store of merchant 10 (Store=Clothing). A separate template is defined for regular customers (Member Group=Regular) that are using personal digital assistants (Device=PDA) and bidding on merchandise in his electronics auction store (Store=Electronics & Auction=1). The resolution mechanism of the preferred embodiment selects the appropriate template based on the attributes associated with the defined template to provide a page that is adapted to reflect who is shopping in which store.

The preferred embodiment allows merchants to customize the look and feel of their stores based on the criteria listed above. Since the look and feel is very important to attracting and keeping visitors on websites, it is important to be able to display catalog pages in a way that is most appealing to each user. Customizable display pages allow this. An advantage of the preferred embodiment is that display page content is adapted to the shopper's interest and display device. All these advantages can be achieved without altering the Internet web site implementation.

In the preferred embodiment, the above system is implemented by storing the data needed to permit the identification of an appropriate template page in a relational database table. The template page is obtained by first executing a relational query on the database. In the preferred embodiment the database table DISPLAYTEMPLATE has attributes that provide the following structure:

| DISPLAYTEMPLATE | | |
| --- | --- | --- |
| INTEGER | CATENTRY_ID | The catalog entry id |
| INTEGER | DEVICEFMT_ID | The device type id |

-continued

| | DISPLAYTEMPLATE | |
|---|---|---|
| INTEGER | STOREENT_ID | The store id |
| STRING | PAGENAME | The template page name |
| STRING | CATENTTYPE_ID | The catalog entry type id |
| INTEGER | AUCTIONSTATE | The flag that indicates if this is a template for auctions |
| INTEGER | MBRGRP_ID | The member group id |
| STRING | DESCRIPTION | A description of this page |
| INTEGER | RANK | A rank number number to break ties |

In the preferred embodiment, an SQL query is defined to choose the appropriate template. The form of the SQL query is defined as follows:

```
select PAGENANE
from
DISPLAYTEMPLATE T1
where
(T1.STOREENT_ID = ? or T1.STOREENT_ID = 0)
and
(T1.catentry_id = ? or T1.catentry_id = 0)
and
(T1.MBRGRP_ID IN (?, ?, ...) or T1.MBRGRP_ID = 0)
and
(T1.devicefmt_id = ? or T1.devicefmt_id = 0)
and
(T1.CATENTTYPE_ID = ? or T1.CATENTTYPE_ID = 'DefaultType')
order by
T1.auctionstate desc, T1.MBRGRP_ID desc, T1.catentry_id
desc, T1.STOREENT_ID desc
```

In the previous query, the "?" represent values that are determined at run time such as the catalog entry that is being displayed or the current device type that is being used. The "0"'s in the SQL query represent default values and DefaultType is a defined default category entry type. The values defining the set to which the value of T1.MBRGRP_ID is compared are similarly determined at runtime.

In the preferred embodiment, template pages 20 are indexed by name. Resolution component 26 includes, or accesses, a relational database management system (RDMS) that stores the table set out above and permits the above SQL query to be carried out on the table. Where possible, resolution component 26 obtains the values that are represented by "?" in the SQL query and uses the value provided in response to the SQL query to obtain a template page from the set represented by template pages 20 in FIG. 1.

Figure 2:
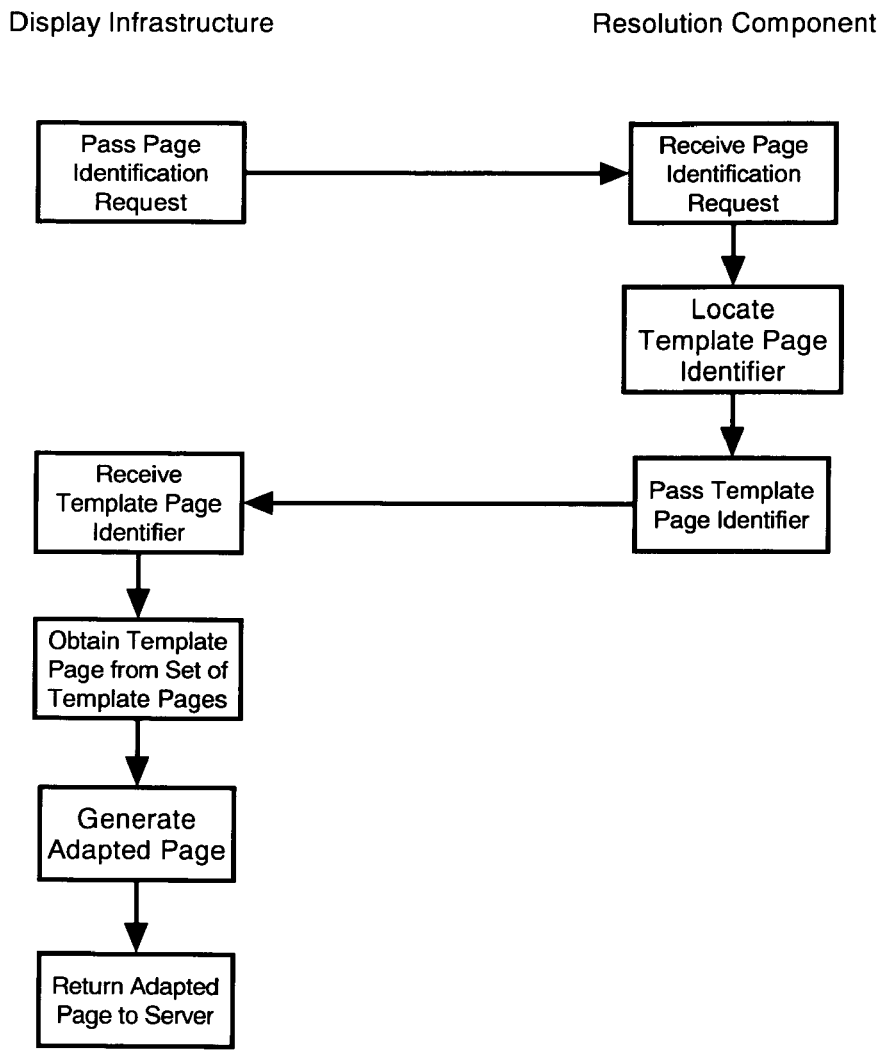
FIG. 2 is a flow chart illustrating a process for adaptive catalog page display.

As shown in FIG. 2, in general terms, the process used by resolution component 26 to determine the correct template page is as follows:

1. Resolution component 26 seeks to obtain data corresponding to each of the following:
   a. the current store that consumer 12 is shopping in (browser 14 is requesting);
   b. the catalog entry that consumer 12 is browsing;
   c. all the member (shopper) groups to which consumer 12 belongs;
   d. the current device type that consumer 12 is using to browse (that browser 14 is running on); and
   e. the type of the catalog entry that is being accessed by consumer 12.

Where the information set out above cannot be determined, resolution component 26 uses a default value.

2. Resolution component 26 then carries out a descending order matching phase in which templates having the most complete matches are located first (this phase is the SQL query step in the above description of the system of the preferred embodiment):
   a. if a template matches all the above (a–e) criteria or attributes then that matching template page is identified by resolution component 26 for display by server 16;
   b. if no template matches all the criteria, then resolution component 26 determines if there is a template that matches any four of the criteria, (eg. 1–4, 1–3+5, etc), with the fifth criteria being a default value that indicates a "don't-care" value for this criteria (in the example of the SQL query set out above, the value 0);
   c. if no template matches any combination of four criteria, then resolution component 26 attempts to match any three criteria. The process is repeated until a matching template page is found.
3. If at any time more than one template satisfies the defined criteria, the Auction Flag and then the Rank Number values are used to select one of the plurality of matching templates.

The above approach to selection of template pages provides that the optimal page for a given consumer 12 will be made available using server 16, by way of display infrastructure 17. The different attributes set out above are defined to provide a system able to adapt the display page for a wide variety of different on-line shopping applications. The preferred embodiment is therefore able to be used by a merchant 10 having different requirements for an on-line store. Further, the structure of the system as shown in FIG. 1 and described above may be used with different criteria or attributes, as required. The preferred embodiment provides for the selection of template pages by retrieving page names based on matching attributes with table values stored in a relational database. This approach may be used with criteria or attributes tailored to other web site applications.

In the preferred embodiment, the template pages are generated by template editor 18 in Java server page (JSP) format. Display infrastructure 17 contains functionality to execute one or more of JSP template pages 20 retrieved as identified by resolution component 26. Display infrastructure 17 defines the page for return to server 16, based on the JSP template page execution and on data relating to the page request received from browser 14. The page returned to server 16 is therefore adapted to the request originally made by consumer 12.

Although a preferred embodiment of the present invention has been described here in detail, it will be appreciated by those skilled in the art that variations may be made thereto without departing from the spirit of the invention or the scope of the appended claims.

The invention claimed is:

1. A computer system for the adaptive display of pages in response to a page request received by a server, the system comprising, a display infrastructure component for receiving the page request from the server, a resolution component for identifying a template page for use in generating an adapted page to be returned to the sever in response to a received page identification request, a set of template page identifiers and associated template page attributes accessible by the resolution component, and a set of template pages, accessible by the display infrastructure component, the display infrastructure comprising means for passing a page identification request to the resolution component in response to the page request from the server, means for receiving a template page identifier from the resolution component, and means for obtaining the template page from the set of template pages corresponding to the received template page identifier and generating and adapted page for return to the server based on the obtained template page, and, the resolution component comprising means for accessing the set of template page identifiers to retrieve one or more members of the set having matching determinable template attribute values associated with the page request and matching default values where template page attribute values are not determinable for the page request, wherein each page request is generated by a consumer for a catalog page for an online store, and the template page attributes comprise a group identifier for the consumer, a catalog entry identifier for the catalog page, a store identifier for the online store, an auction flag for the identified catalog entry, and, a catalog entry type identifier for the catalog page.

2. The computer system of claim 1 in which the set of template page identifiers and associated template page attributes are stored as a relational database table and are accessible by the resolution component by relational queries.

3. The computer system of claim 1 in which the set of template pages comprises Java server page files and in which the display infrastructure component comprises means for executing Java sewer page files.

4. The computer system of claim 1 further comprising a template editor for generating members of the set of template pages.

5. The computer system of claim 4 in which the template editor generates Java server page files.

6. The computer system of claim 1 in which the page request is associated with a device type determined by the device used by the consumer in requesting a page, and in which the template page attributes further comprise a device type identifier for identifying device type of the consumer, and a rank number for ranking template pages where multiple template pages match the template page attribute values.

7. A method for the adaptive display of pages in a server environment in response to a page request received by a server, the server environment comprising, a display infrastructure component for receiving the page request from the server, a resolution component for identifying a template page for use in generating an adapted page to be returned to the sever in response to a received page identification request, a set of template page identifiers and associated template page attributes accessible by the resolution component, and a set of template pages, accessible by the display infrastructure component, the method comprising the following steps:

the display infrastructure passing a page identification request to the resolution component in response to the page request from the server, the display infrastructure receiving a template page identifier from the resolution component, and the display infrastructure obtaining the template page from the set of template pages corresponding to the received template page identifier and generating an adapted page for return to the sewer based on the obtained template page, and, the resolution component accessing the set of template page identifiers to retrieve one or more members of the set having matching determinable template page attribute values associated with the page request and matching default values where template page attribute values are not determinable for the page request, wherein the template page attributes comprise a group identifier for the consumer, a catalog entry identifier for the catalog page, a store identifier for the online store, an auction flag for the identified catalog entry, and, a catalog entry type identifier for the catalog page.

8. The method of claim 7 in which the set of template page identifiers and associated template page attributes are stored as a relational database table and which the step of the resolution component accessing the set of template page identifiers comprises the step of generating a relational query to obtain data from the relational database table.

9. The method of claim 7 in which the page request is associated with a device type determined by the device used by the consumer in requesting a page, and in which the template page attributes further comprise a device type identifier for identifying device type of the consumer, and a rank number for ranking template pages where multiple template pages match the template page attribute values.

10. A computer program product for adaptive page display of pages, the computer program product comprising a computer usable medium having computer readable code means embodied in said medium, comprising computer readable program code means for carrying out the method of claims 8, or 9, wherein said medium comprise a recordable data storage medium.

* * * * *